(No Model.)
E. BROWN.
PYROMETER.
No. 261,905.  Patented Aug. 1, 1882.
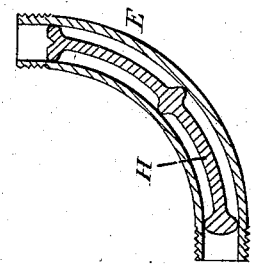
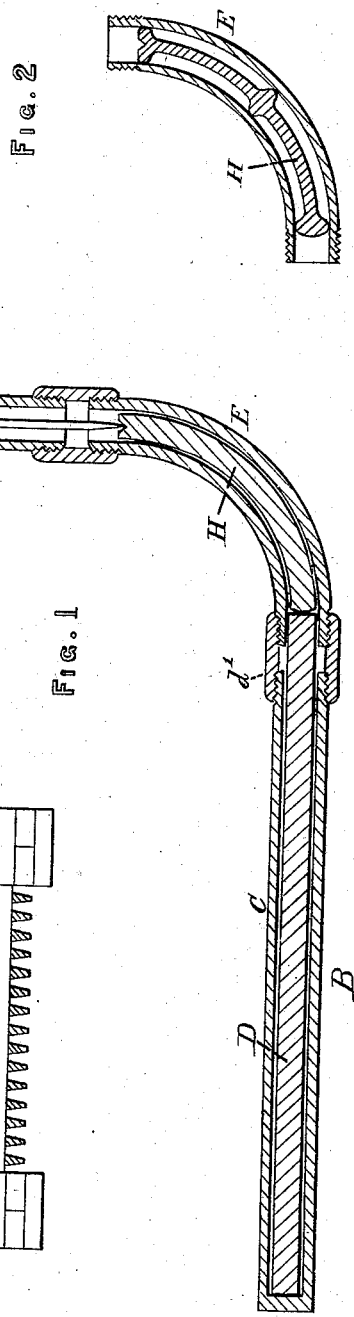
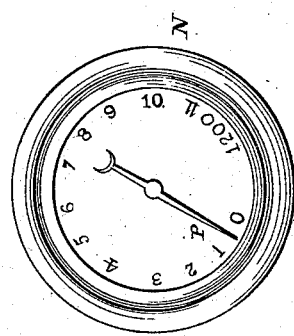
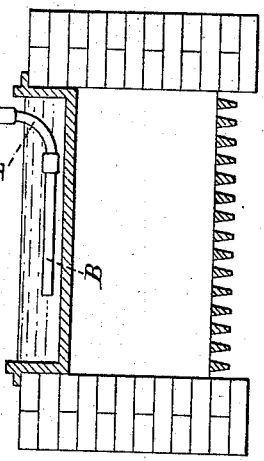
Witnesses.
Parks McFarland, Jr.
John F. Grant
Inventor.
Edw Brown

UNITED STATES PATENT OFFICE.

EDWARD BROWN, OF PHILADELPHIA, PENNSYLVANIA.

PYROMETER.

SPECIFICATION forming part of Letters Patent No. 261,905, dated August 1, 1882.

Application filed May 1, 1882. (No model.)

*To all whom it may concern:*

Be it known that I, EDWARD BROWN, of Philadelphia, Pennsylvania, have invented a new and useful Pyrometer for Indicating the Temperature of Shallow Liquids, of which the following is a specification.

My invention is intended for use where the depth of the liquid or melted metal is only one or two inches deep, and where there is no facility for inserting an ordinary pyrometer horizontally through the side of the vessel containing the metal.

It consists in combining the usual expansion-stem of a pyrometer with a curved pipe containing a curved sliding bar, by which the differential motion of the stem can be conveyed to the pointer of the instrument through a short pipe placed at an angle with the expansion-stem.

Figure 1 is an elevation of my pyrometer with the new portion of it in section. Fig. 2 shows a modification of the interior curved bar. Fig. 3 shows the instrument in a bath of melted lead.

B is the expansion-stem of the instrument, consisting of an outside tube, C, and an inside non-expanding rod of plumbago ware, D. This is connected by a coupling, $d'$, with a tube, E, bent to the radius of a circle. Within this tube is fitted a curved sliding bar, H. When putting the instrument together the bar H is dropped in at the upper end, and its lower end rests against the rod D. To the top end of this curved piece E is coupled the short joint of pipe K, preferably at right angles, and within this is placed the connecting-link M, the lower end resting on the curved bar. The head N, with the usually contained mechanism, is then screwed on and the link M connected therewith. The rod D and bar H and connecting-link M are kept in contact by a spring in the head N, which has been shown in my previous patents. The curved pipe E and the sliding bar H terminate substantially at the same point to permit of the introduction of the said bar, and though the bar may be accurately fitted sufficiently to insure a smooth movement of the pointer P a short motion endwise, sufficient to move the pointer around the dial, may be obtained.

In Fig. 2 the bar H is shown with projections fitting the tube, which permits the bar to be bent more easily and the construction of the pyrometer facilitated. By this construction an expansion-stem twelve or eighteen inches long may be used in a bath of melted tin one or two inches deep and an accurate indication of the temperature obtained.

I claim—

In a pyrometer, the combination of the differential expansion-stem B, the curved connecting-pipe E, containing the sliding bar H for conveying the motion of the expansion-stem to the connecting-rod M at an angle with the stem, substantially as herein described.

EDW. BROWN.

Witnesses:
PARK MCFARLAND, Jr.,
JOHN F. GRANT.